US 12,366,714 B2

(12) United States Patent
Yang et al.

(10) Patent No.: US 12,366,714 B2
(45) Date of Patent: Jul. 22, 2025

(54) OPTICAL MODULE

(71) Applicant: Hisense Broadband Multimedia Technologies Co., Ltd., Shandong (CN)

(72) Inventors: Liu Yang, Shandong (CN); Jinlei Chen, Shandong (CN); Qiang Zhang, Shandong (CN); Shihai Yang, Shandong (CN); Wei Cui, Shandong (CN); Baofeng Si, Shandong (CN); Yuqing Hong, Shandong (CN); Hongchao Pan, Shandong (CN); Hua Zhang, Shandong (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 476 days.

(21) Appl. No.: 17/888,966

(22) Filed: Aug. 16, 2022

(65) Prior Publication Data
US 2022/0390692 A1 Dec. 8, 2022

Related U.S. Application Data

(63) Continuation of application No. PCT/CN2021/089078, filed on Apr. 22, 2021.

(30) Foreign Application Priority Data

Jun. 2, 2020 (CN) .......................... 202020981478.8
Jul. 10, 2020 (CN) .......................... 202010661805.6

(51) Int. Cl.
*G02B 6/42* (2006.01)
*H04B 10/50* (2013.01)

(52) U.S. Cl.
CPC ........... *G02B 6/426* (2013.01); *G02B 6/4267* (2013.01); *G02B 6/4269* (2013.01); *G02B 6/428* (2013.01); *H04B 10/502* (2013.01)

(58) Field of Classification Search
CPC .... G02B 6/4267; G02B 6/428; G02B 6/4206; G02B 6/4201
See application file for complete search history.

(56) References Cited

U.S. PATENT DOCUMENTS 7,621,773 B2 * 11/2009 Bright ................. G02B 6/0008
439/490
8,135,282 B2 3/2012 Hosking
(Continued)

FOREIGN PATENT DOCUMENTS

CN 103091796 A 5/2013
CN 105652392 A 6/2016
(Continued)

OTHER PUBLICATIONS

International Search Report (PCT/ISA/210) and Written Opinion (PCT/ISA/237) issued in PCT Application No. PCT/CN2021/089078 dated Jul. 12, 2021 with English Translation.
(Continued)

*Primary Examiner* — Eric Wong
(74) *Attorney, Agent, or Firm* — Morgan, Lewis & Bockius LLP

(57) ABSTRACT

An optical module includes a shell, a circuit board, a display light and a light guide pipe. The circuit board is disposed in the shell. The display light is disposed on the circuit board, and is configured to emit light of different colors. The light guide pipe is disposed between the shell and the circuit board. An input end of the light guide pipe is arranged to correspond to the display light, an output end of the light guide pipe is configured to transmit light emitted by the display light to an outside of the optical module. The shell includes a groove. The output end of the light guide pipe is fixed in the groove, so that the shell is fixed with the light guide pipe.

20 Claims, 8 Drawing Sheets

(56) References Cited

U.S. PATENT DOCUMENTS

| | | | |
|---|---|---|---|
| 8,861,972 B2 | 10/2014 | Hosking | |
| 2009/0258534 A1* | 10/2009 | Bright | G02B 6/4246 |
| | | | 439/490 |
| 2012/0155108 A1* | 6/2012 | Scholeno | G02B 6/4298 |
| | | | 362/580 |
| 2015/0010310 A1* | 1/2015 | Chien | H04B 10/40 |
| | | | 398/116 |
| 2019/0363788 A1* | 11/2019 | Yi | H04B 10/07 |
| 2020/0278510 A1 | 9/2020 | Zhou et al. | |

FOREIGN PATENT DOCUMENTS

| | | | | |
|---|---|---|---|---|
| CN | 106473928 A | | 3/2017 | |
| CN | 107154821 A | | 9/2017 | |
| CN | 107517082 A | | 12/2017 | |
| CN | 207946669 U | | 10/2018 | |
| CN | 109061813 A | | 12/2018 | |
| CN | 109633833 A | | 4/2019 | |
| CN | 109870777 A | | 6/2019 | |
| CN | 209215644 U | * | 8/2019 | G02B 6/424 |
| CN | 110426795 A | | 11/2019 | |
| CN | 212083742 U | | 12/2020 | |

OTHER PUBLICATIONS

Office Action issued in corresponding Chinese Patent Application No. 202010661805.6 dated May 7, 2022 with English Translation.

* cited by examiner

OPTICAL MODULE

CROSS-REFERENCE TO RELATED APPLICATIONS

This application is a Continuation Application of PCT/CN2021/089078 filed on Apr. 22, 2021, which claims priority to Chinese Patent Application No. 202020981478.8 filed on Jun. 2, 2020, and Chinese Patent Application No. 202010661805.6 filed on Jul. 10, 2020, which are incorporated herein by reference in their entirety.

TECHNICAL FIELD

The present disclosure relates to the field of optical communication technologies, and in particular, to an optical module.

BACKGROUND

Optical communication technologies are used in various new businesses and application scenarios such as cloud computing, mobile Internet, and video conferencing. In optical communication, an optical module is a tool for achieving interconversion between an optical signal and an electrical signal, and is a key component in an optical communication device. Generally, the optical module includes a light emitting device and a light receiving device. The light emitting device is configured to convert an electrical signal into an optical signal and transmit the optical signal out through an optical fiber, and the light receiving device is configured to convert an optical signal transmitted from the optical fiber into an electrical signal.

SUMMARY

An optical module is provided. The optical module includes a shell, a circuit board, a display light and a light guide pipe. The circuit board is disposed inside the shell. The display light is disposed on the circuit board, and is configured to emit light of different colors. The light guide pipe is disposed between the shell and the circuit board. An input end of the light guide pipe is arranged to correspond to the display light, an output end of the light guide pipe is configured to transmit light emitted by the display light to an outside of the optical module. The shell includes a groove. The output end of the light guide pipe is fixed in the groove, so that the shell is fixed with the light guide pipe.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
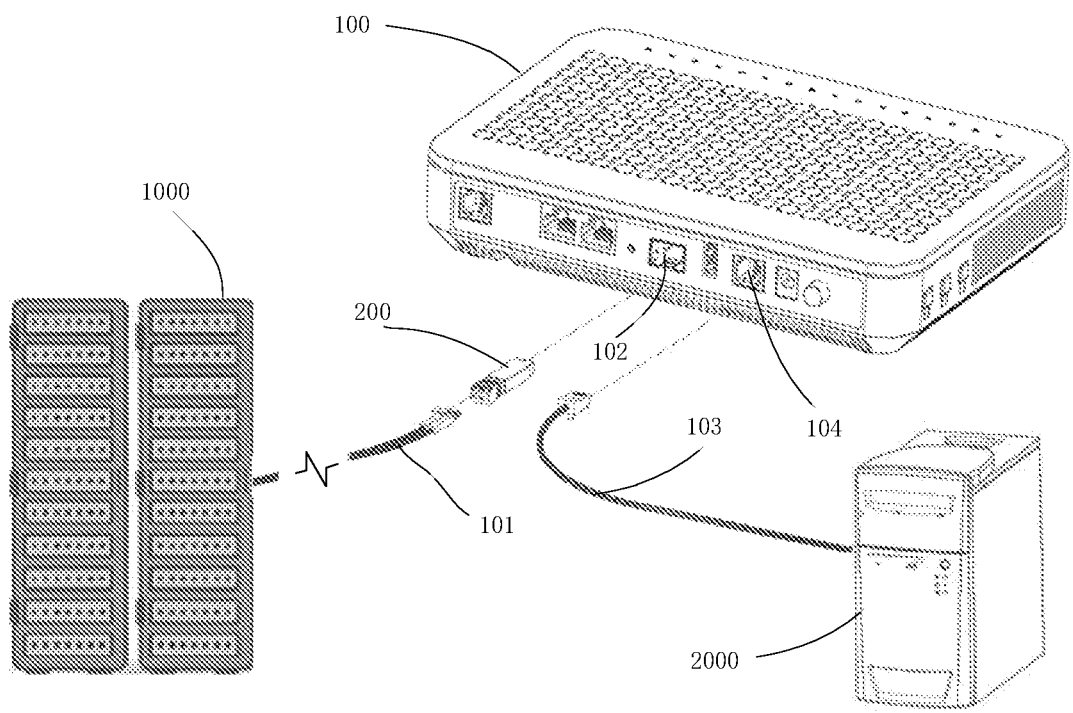
FIG. 1 is a diagram showing a connection relationship of an optical communication system, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art on a basis of the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to". In the description of the specification, terms such as "one embodiment", "some embodiments", "exemplary embodiments", "an example", "a specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, features defined by the terms "first" and "second" may explicitly or implicitly include one or more of the features. In the description of the embodiments of the present disclosure, the term "a plurality of" or "the plurality of" means two or more unless otherwise specified.

In the description of some embodiments, the terms "coupled", "connected", and derivatives thereof may be used. For example, the term "connected" may be used when describing some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other but still cooperate or interact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of "applicable to" or "configured to" herein indicates an open and inclusive expression, which does not exclude devices that are applicable to or configured to perform additional tasks or steps.

The term "about", "substantially" or "approximately" as used herein includes a stated value and an average value within an acceptable range of deviation of a particular value. The acceptable range of deviation is determined by a person of ordinary skill in the art inconsideration of the measurement in question and errors associated with the measurement of a particular quantity (i.e., limitations of the measurement system).

In an optical communication system, an optical signal is used to carry information to be transmitted, and the optical signal carrying the information is transmitted to an information processing device such as a computer through an information transmission device such as an optical fiber or an optical waveguide, so as to achieve transmission of the information. Due to the passive transmission characteristic of light when being transmitted through the optical fiber or the optical waveguide, low-cost and low-loss information transmission may be achieved. In addition, since a signal transmitted by the information transmission device such as the optical fiber or the optical waveguide is an optical signal, and a signal that may be recognized and processed by the information processing device such as a computer is an electrical signal, in order to establish information connection between the information transmission device such as the optical fiber or the optical waveguide and the information processing device such as the computer, there is a need to achieve interconversion between the electrical signal and the optical signal.

In the field of optical communication technology, an optical module may achieve interconversion between the optical signal and the electrical signal. The optical module includes an optical port and an electrical port. The optical module achieves optical communication with the information transmission device such as the optical fiber or the optical waveguide through the optical port, and the optical module achieves electrical connection with an optical network terminal (e.g., an optical modem) through the electrical port. The electrical connection is mainly used for implementing power supply, I2C signal transmission, data information transmission and grounding. The optical network terminal transmits the electrical signal to the information processing device such as a computer through a network cable or wireless fidelity (Wi-Fi).

FIG. 1 is a diagram showing a connection relationship of an optical communication system. As shown in FIG. 1, the optical communication system includes a remote server 1000, a local information processing device 2000, an optical network terminal 100, an optical module 200, an optical fiber 101 and a network cable 103.

An end of the optical fiber 101 is connected to the remote server 1000, and another end thereof is connected to the optical network terminal 100 through the optical module 200. The optical fiber itself supports long-distance signal transmission, for example, signal transmission over several kilometers (6 kilometers to 8 kilometers). Based on this, if repeaters are used, theoretically, it may be possible to achieve infinite-distance transmission. Therefore, in a typical optical communication system, a distance between the remote server 1000 and the optical network terminal 100 may typically reach several kilometers, dozens of kilometers, or hundreds of kilometers.

An end of the network cable 103 is connected to the local information processing device 2000, and another end thereof is connected to the optical network terminal 100. The local information processing device 2000 includes one or more of a router, a switch, a computer, a mobile phone, a tablet computer or a television.

A physical distance between the remote server 1000 and the optical network terminal 100 is greater than a physical distance between the local information processing device 2000 and the optical network terminal 100. Connection between the local information processing device 2000 and the remote server 1000 is achieved by the optical fiber 101 and the network cable 103, and connection between the optical fiber 101 and the network cable 103 is achieved by the optical module 200 and the optical network terminal 100.

The optical module 200 includes an optical port and an electrical port. The optical port is configured to connect to the optical fiber 101, so that a bidirectional optical signal connection is established between the optical module 200 and the optical fiber 101. The electrical port is configured to connect to the optical network terminal 100, so that a bidirectional electrical signal connection is established between the optical module 200 and the optical network terminal 100. The optical module 200 may achieve interconversion between the optical signal and the electrical signal, so that information connection is established between the optical fiber 101 and the optical network terminal 100. For example, an optical signal from the optical fiber 101 is converted into an electrical signal by the optical module 200, and then the electrical signal is input to the optical network terminal 100; and an electrical signal from the optical network terminal 100 is converted into an optical signal by the optical module 200, and then the optical signal is input to the optical fiber 101. Since the optical module 200 is a tool for achieving interconversion between the optical signal and the electrical signal, and doesn't have a data processing function, the information does not change in the above photoelectric conversion process.

The optical network terminal 100 includes a housing in a substantially cuboid shape, and an optical module interface 102 and a network cable interface 104 that are disposed on the housing. The optical module interface 102 is configured to connect to the optical module 200, so that a bidirectional electrical signal connection is established between the optical network terminal 100 and the optical module 200. The network cable interface 104 is configured to connect to the network cable 103, so that a bidirectional electrical signal connection is established between the optical network terminal 100 and the network cable 103. A connection between the optical module 200 and the network cable 103 is established through the optical network terminal 100. For example, the optical network terminal 100 transmits an electrical signal from the optical module 200 to the network cable 103, and transmits an electrical signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further includes an optical line terminal (OLT).

A bidirectional signal transmission channel has been established between the remote server 1000 and the local information processing device 2000 through the optical fiber 101, the optical module 200, the optical network terminal 100 and the network cable 103.

Figure 2:
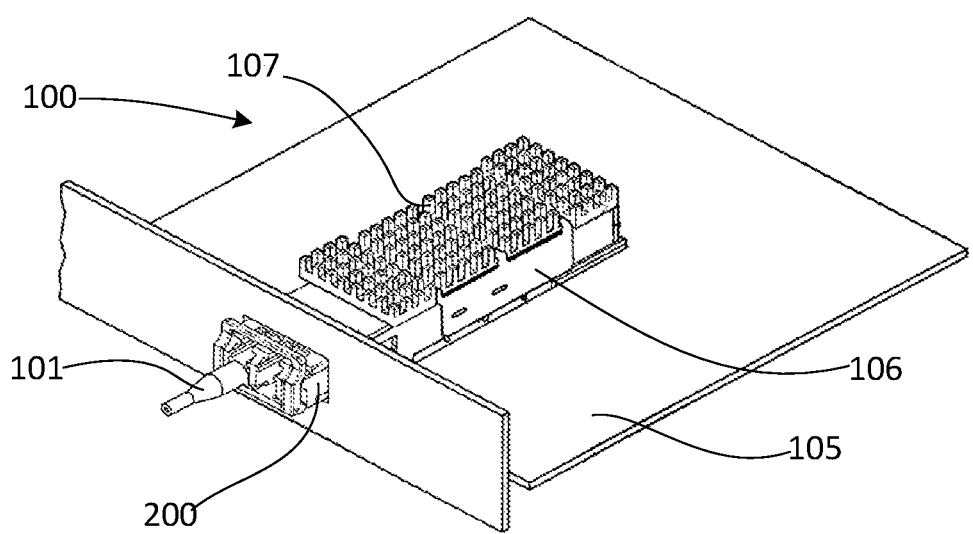
FIG. 2 is a structural diagram of an optical network terminal, in accordance with some embodiments.

FIG. 2 is a structural diagram of an optical network terminal. In order to clearly show a connection relationship between the optical module 200 and the optical network terminal 100, FIG. 2 only shows a structure of the optical network terminal 100 that is related to the optical module 200. As shown in FIG. 2, the optical network terminal 100 further includes a circuit board 105 disposed in the housing, a cage 106 disposed on a surface of the circuit board 105, a heat sink 107 disposed on the cage 106, and an electrical connector disposed inside the cage 106. The electrical connector is configured to connect to the electrical port of the optical module 200. The heat sink 107 has protruding portions such as fins for increasing a heat dissipation area.

The optical module 200 is inserted into the cage 106 of the optical network terminal 100, and the optical module 200 is fixed by the cage 106. Heat generated by the optical module 200 is conducted to the cage 106 and is then dissipated through the heat sink 107. After the optical module 200 is inserted into the cage 106, the electrical port of the optical module 200 is connected to the electrical connector inside the cage 106, so that a bidirectional electrical signal connection is established between the optical module 200 and the optical network terminal 100. In addition, the optical port of the optical module 200 is connected to the optical fiber 101, so that a bidirectional optical signal connection is established between the optical module 200 and the optical fiber 101.

Figure 3:
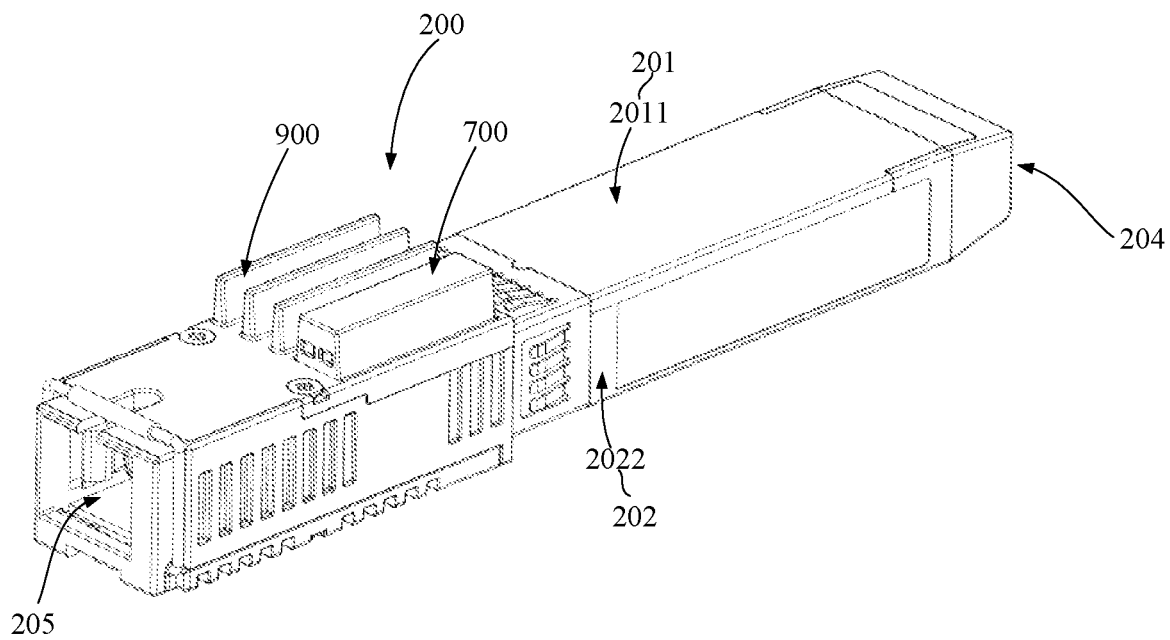
FIG. 3 is a structural diagram of an optical module, in accordance with some embodiments.
Figure 4:
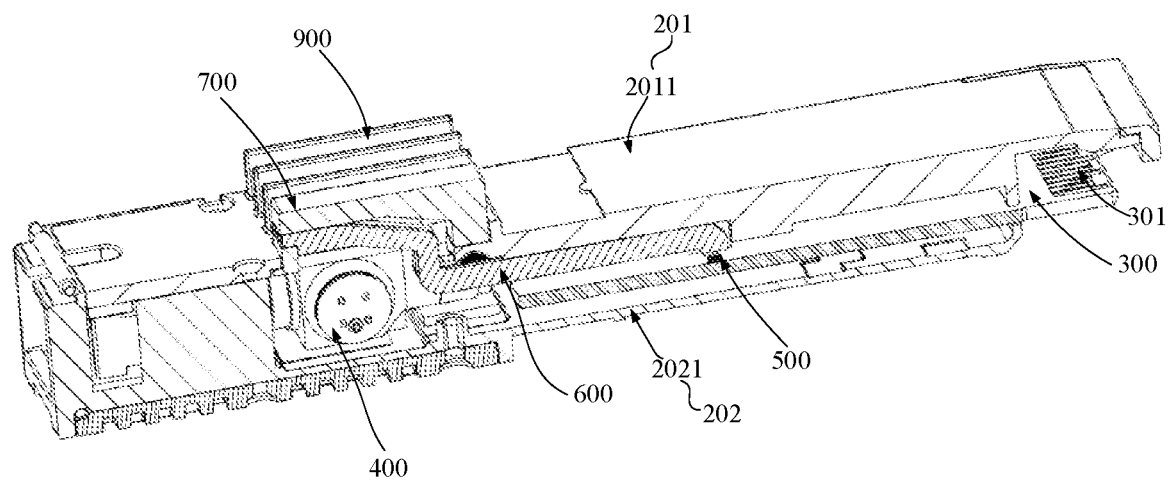
FIG. 4 is a cross-sectional diagram of an optical module, in accordance with some embodiments.
Figure 5:
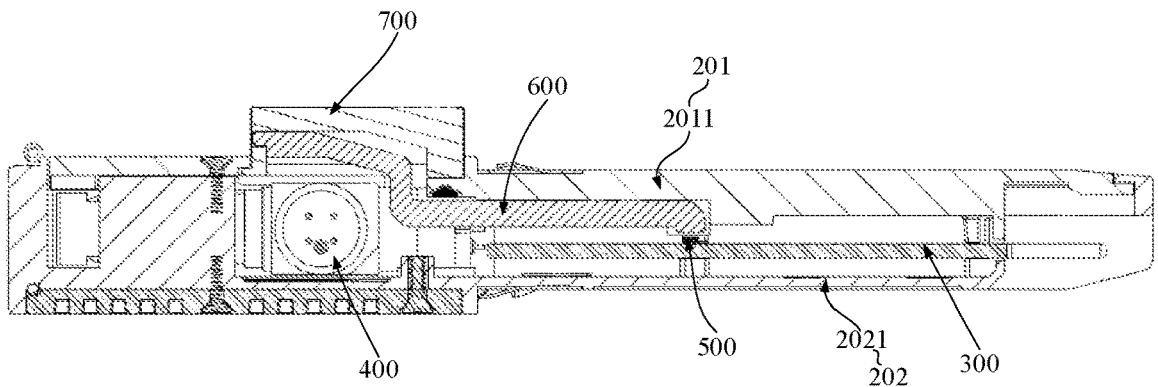
FIG. 5 is a cross-sectional diagram of an optical module from another perspective, in accordance with some embodiments.

FIG. 3 is a structural diagram of an optical module, in accordance with some embodiments. FIG. 4 is a cross-sectional diagram of an optical module, in accordance with some embodiments. FIG. 5 is a cross-sectional diagram of an optical module from another perspective, in accordance with some embodiments. As shown in FIGS. 3, 4 and 5, the optical module 200 includes a shell, and a circuit board 300 and an optical transceiver assembly 400 that are disposed inside the shell.

The shell includes an upper shell 201 and a lower shell 202. The upper shell 201 covers the lower shell 202 to form the shell having two openings. An outer contour of the shell is generally in a cuboid shape.

In some embodiments of the present disclosure, the lower shell 202 includes a bottom plate 2021 and two lower side plates 2022 that are located on two sides of the bottom plate 2021 and disposed perpendicular to the bottom plate 2021. The upper shell 201 includes a cover plate 2011, and the cover plate 2011 covers the two lower side plates 2022 of the lower shell 202 to form the shell.

In some embodiments, the lower shell 202 includes a bottom plate 2021 and two lower side plates 2022 that are located on two sides of the bottom plate 2021 and disposed perpendicular to the bottom plate 2021. The upper shell 201 includes a cover plate 2011 and two upper side plates that are located on two sides of the cover plate 2011 and disposed perpendicular to the cover plate 2011. The two upper side plates are combined with the two lower side plates 2022 respectively, so that the upper shell 201 covers the lower shell 202.

A direction in which a connection line between the two openings 204 and 205 extends may be the same as a longitudinal direction of the optical module 200, or may not be the same as the longitudinal direction of the optical module 200. For example, the opening 204 is located at an end (a right end in FIG. 3) of the optical module 200, and the opening 205 is also located at an end (a left end in FIG. 3) of the optical module 200. Alternatively, the opening 204 is located at an end of the optical module 200, and the opening 205 is located at a side of the optical module 200. The opening 204 is the electrical port, and a connecting finger 301 of the circuit board 300 extends out from the electrical port 204, and is inserted into the master monitor (e.g., the optical network terminal 100). The opening 205 is the optical port, and is configured to connect to an external optical fiber 101, so that the external optical fiber 101 is connected to the optical transceiver assembly 400 in the optical module 200.

By adopting an assembly mode of combining the upper shell 201 with the lower shell 202, it may be easier to install the circuit board 300, the optical transceiver assembly 400 and other components into the shell, and the upper shell 201 and the lower shell 202 may provide sealing and protection for these components. In addition, when the circuit board 300, the optical transceiver assembly 400 and other components are assembled, it may be easier to arrange the positioning elements, heat dissipation elements and electromagnetic shielding elements of these components, which facilitates the implementation of automated production.

In some embodiments, the upper shell 201 and the lower shell 202 are generally made of a metal material, which helps achieve electromagnetic shielding and heat dissipation.

In some embodiments, the optical module 200 further includes an unlocking component 203 located outside of the shell. The unlocking component 203 is configured to implement a fixed connection between the optical module 200 and the master monitor, or to release the fixed connection between the optical module 200 and the master monitor.

For example, the unlocking component is located on outer walls of the two lower side plates 2022 of the lower shell 202, and has an engagement element that is matched with the cage (e.g., the cage 106 of the optical network terminal 100) of the master monitor. When the optical module 200 is inserted into the cage of the master monitor, the optical module 200 is fixed in the cage of the master monitor by the engagement element of the unlocking component. When the unlocking component 200 is pulled, the engagement element of the unlocking component moves along with the unlocking component, and then a connection relationship between the engagement element and the master monitor is changed to release the engagement between the optical module 200 and the master monitor, so that the optical module 200 may be pulled out of the cage of the master monitor.

The circuit board 300 includes circuit traces, electronic elements, chips, etc. Through the circuit traces, the electronic elements and the chips are connected together according to circuit design, so as to implement power supply, electrical signal transmission, and grounding functions. The electronic elements may include, for example, a capacitor, a resistor, a triode, and a metal-oxide-semiconductor field-effect transistor (MOSFET). The chips may include, for example, a microcontroller unit (MCU), a laser driving chip, a limiting amplifier, a clock and data recovery (CDR) chip, a power management chip or a digital signal processing (DSP) chip.

The circuit board 300 is generally a rigid circuit board. Since it is made of a relatively hard material, the rigid circuit board may also have a support function. For example, the rigid circuit board may stably support the electronic elements and the chips. In a case where the optical transceiver assembly is located on the circuit board, the rigid circuit board may also provide stable support. The rigid circuit board may also be inserted into the electrical connector in the cage of the master monitor.

The circuit board 300 further includes a connecting finger 301 formed on an end surface thereof, and the connecting finger 301 is composed of a plurality of independent pins. The circuit board 300 is inserted into the cage 106, and is conductively connected to the electrical connector in the cage 106 through the connecting finger 301. The connecting finger 301 may be disposed on only one surface (e.g., an upper surface shown in FIG. 4) of the circuit board 300, or may be disposed on both upper and lower surfaces of the circuit board 300 to adapt to an occasion where a large number of pins are needed. The connecting finger 301 is configured to establish an electrical connection with the master monitor to implement power supply, grounding, I2C signal transmission, and data signal transmission functions.

Of course, flexible circuit boards are also used in some optical modules. A flexible circuit board is generally used in conjunction with a rigid circuit board as a supplement for the rigid circuit board. For example, the rigid circuit board may be connected to the optical transceiver assembly through a flexible circuit board.

The optical transceiver assembly 400 includes a light emitting device and a light receiving device. The light emitting device is configured to emit an optical signal, and the light receiving device is configured to receive an optical signal. For example, the light emitting device and the light receiving device are combined together to form an integrated optical transceiver assembly.

Figure 6:
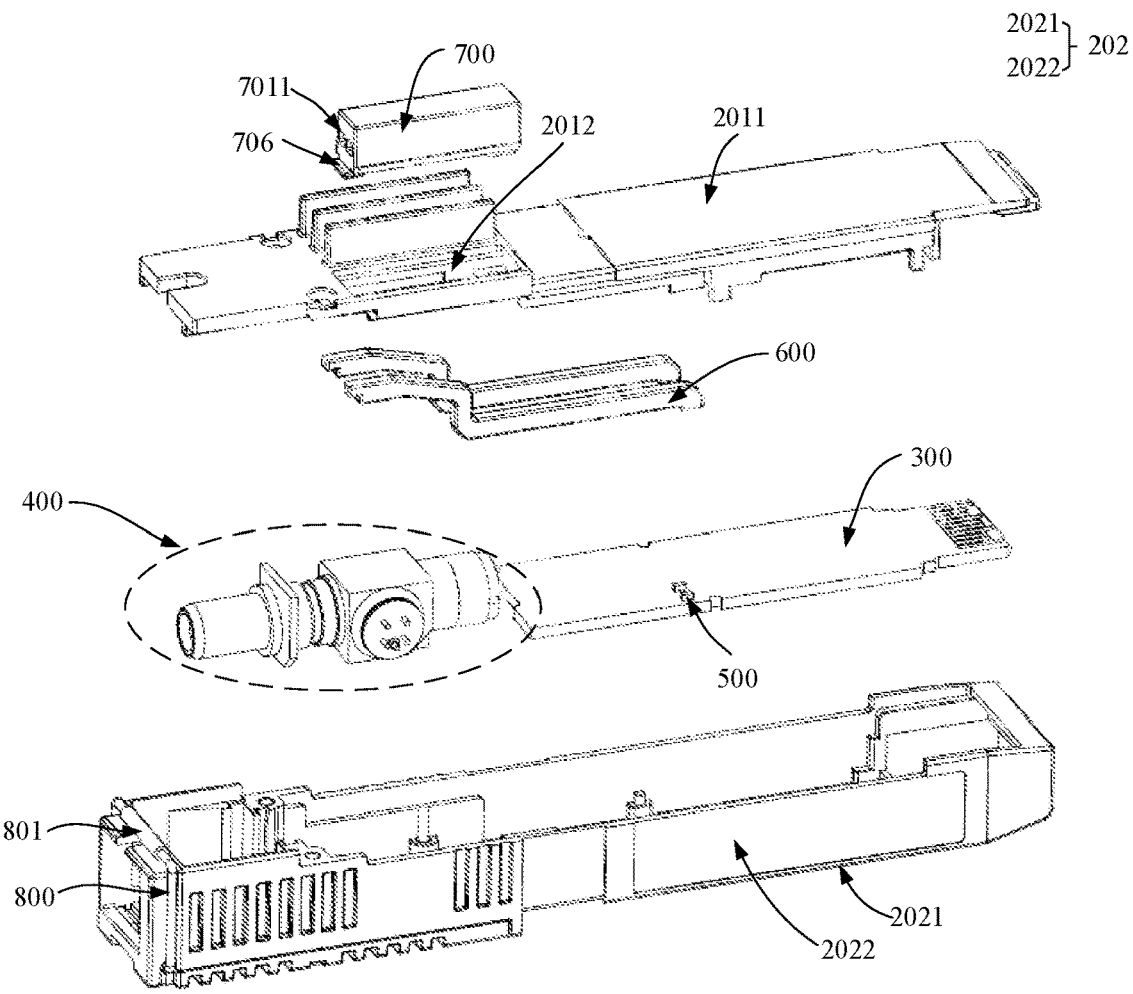
FIG. 6 is an exploded diagram of an optical module, in accordance with some embodiments.

FIG. 6 is an exploded diagram of an optical module, in accordance with some embodiments. As shown in FIG. 6, the optical module 200 further includes a display light 500 disposed on the circuit board 300 and a light guide pipe 600 disposed between the cover plate 2011 of the upper shell 201 and the circuit board 300. The display light 500 is configured to emit light of different colors. An input end of the light guide pipe 600 corresponds to the display light 500, and the light guide pipe 600 is configured to transmit the light emitted by the display light 500.

The material of the light guide pipe 600 is a semi-transparent material, which includes acrylic or polycarbonate (PC). The light emitted by the display light 500 is incident on the input end of the light guide pipe 600, is then transmitted inside the light guide pipe 600, and finally exits from an output end of the light guide pipe 600.

In some embodiments of the present disclosure, in a case where the optical module emits and receives optical signals normally (that is, in a case where both the light emitting device and the light receiving device of the optical module operate normally), the display light 500 emits green light. In a case where the light emitting device has a problem of "TX Disable", the display light 500 emits yellow light. In a case where the light emitting device has a problem of "RX Loss of Signal", the display light 500 emits red light. For example, the display light 500 includes a light-emitting diode (LED).

Figure 7:
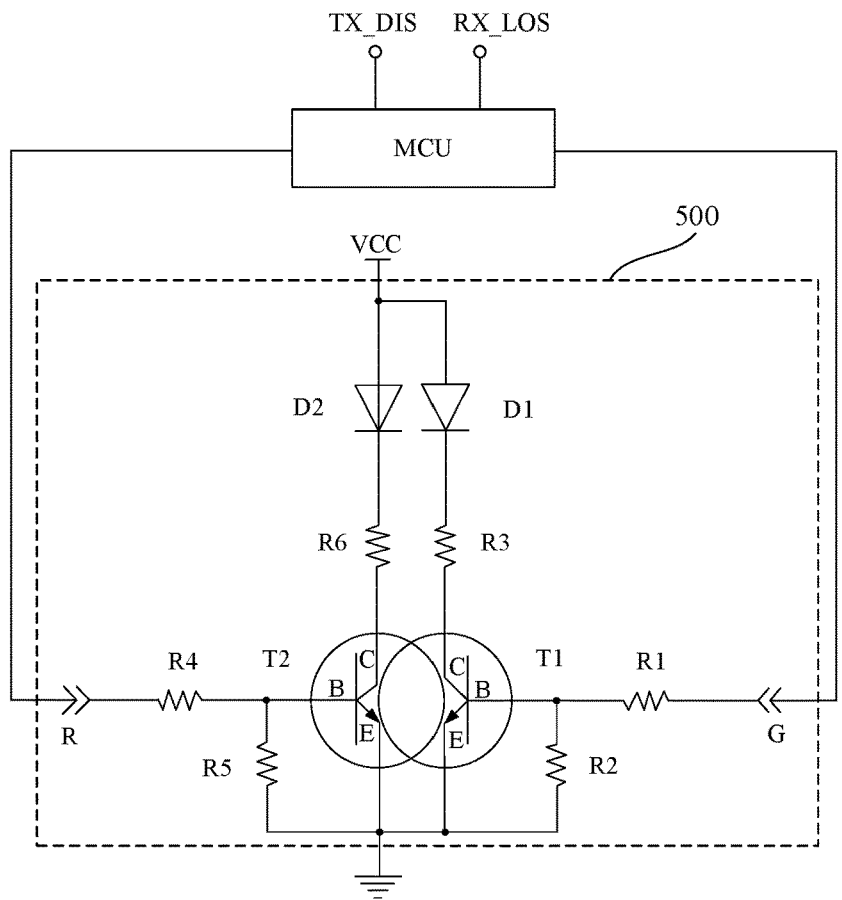
FIG. 7 is a diagram showing an operation principle of a display light in an optical module, in accordance with some embodiments.

FIG. 7 is a diagram showing an operation principle of a display light in an optical module, in accordance with some embodiments. As shown in FIG. 7, the display light 500 includes a first light-emitting diode D1, a first triode T1, a first resistor R1, a second resistor R2 and a third resistor R3. A base B of the first triode T1 is connected to a green end G through the first resistor R1, an emitter E of the first triode T1 is grounded, and a collector C of the first triode T1 is connected to a cathode of the first light-emitting diode D1 through the third resistor R3. An anode of the first light-emitting diode D1 is connected to an external power source VCC. A terminal of the second resistor R2 is connected to the base B of the first triode T1, and the other terminal of the second resistor R2 is connected to the emitter E of the first triode T1.

The display light 500 further includes a second light-emitting diode D2, a second triode T2, a fourth resistor R4, a fifth resistor R5 and a sixth resistor R6. A base B of the second triode T2 is connected to a red end R through the fourth resistor R4, an emitter E of the second triode T2 is grounded, and a collector C of the second triode T2 is connected to a cathode of the second light-emitting diode D2 through the sixth resistor R6. An anode of the second light-emitting diode D2 is connected to the external power source VCC. A terminal of the fifth resistor R5 is connected to the base B of the second triode T2, and the other terminal of the fifth resistor R5 is connected to the emitter E of the second triode T2.

For example, the first triode T1 and the second triode T2 are bipolar junction transistors (BJTs), the first light-emitting diode D1 is a green light-emitting diode, and the second light-emitting diode D2 is a red light-emitting diode.

A signal output by a control pin TX_DIS of the light emitting device is used to indicate an operation state of the light emitting device, and a signal output by a control pin RX_LOS of the light receiving device is used to indicate an operation state of the light receiving device. The control pin TX_DIS and the control pin RX_LOS each inputs a signal to a processor, such as an MCU, and the MCU controls a signal input to the green end G and a signal input to the red end R according to the received two signals, so as to control a color of the light emitted by the display light 500.

In some embodiments, the processor is not limited to the MCU, but may also include a central processing unit (CPU), a microprocessor, and an application specific integrated circuit (ASIC).

A light-emitting principle of the display light 500 is described below by taking an example in which the first triode T1 and the second triode T2 are both NPN transistors. In a case where the optical module is in a normal operation state (that is, in a case where both the light emitting device and the light receiving device of the optical module operate normally), the control pin TX_DIS and the control pin RX_LOS each outputs a low level, and the MCU controls a high level to be input to the green end G and controls a low level to be input to the red end R according to the received two low level signals. In this case, the first triode T1 works in an amplifying region, and drives the first light-emitting diode D1 to emit green light. The second triode T2 is turned off, and the second light-emitting diode D2 does not emit light.

In a case where the light emitting device has the problem of "TX Disable" and the light receiving device operates normally, the control pin TX_DIS outputs a high level, and the control pin RX_LOS outputs a low level, and the MCU controls a high level to be input to both the green end G and the red end R according to the received high level signal and low level signal. In this case, both the first triode T1 and the second triode T2 operate in the amplifying region, and the first triode T1 drives the first light-emitting diode D1 to emit green light and the second triode T2 drives the second light-emitting diode D2 to emit red light. The red light and green light are mixed into yellow light.

In a case where the light emitting device operates normally, and the light receiving device has the problem of "RX Loss of Signal", the control pin TX_DIS outputs a low level, the control pin RX_LOS outputs a high level, and the MCU controls a low level to be input to the green end G and controls a high level to be input to the red end R according to the received low level signal and high level signal. In this case, the first triode T1 is turned off, and the first light-emitting diode D1 does not emit light. The second triode T2 operates in the amplifying region, and drives the second light-emitting diode D2 to emit red light.

The light guide pipe 600 may transmit the light emitted by the display light 500 to an outside of the optical module 200, so that the user may directly tell which problem the optical module has according to the color of the light transmitted by the light guide pipe 600. That is, in a case where the light transmitted by the light guide pipe 600 is green, it indicates that both the light emitting device and the light receiving device of the optical module operate normally; in a case where the light transmitted by the light guide pipe 600 is yellow, it indicates that the light emitting device of the optical module has the problem of "TX Disable"; and in a case where the light transmitted by the light guide pipe 600 is red, it indicates that the light receiving device of the optical module has the problem of "RX Loss of Signal". In this way, the user may directly get a clear understanding of the operation state of the optical module, and determine a position of a failure according to the color of the light transmitted by the light guide pipe 600 in a case where the optical module has a failure. For example, the yellow light indicates that the light emitting device of the optical module is faulty, and the red light indicates that the light receiving device of the optical module is faulty, which makes it very convenient to quickly locate the position of the failure.

Figure 13:
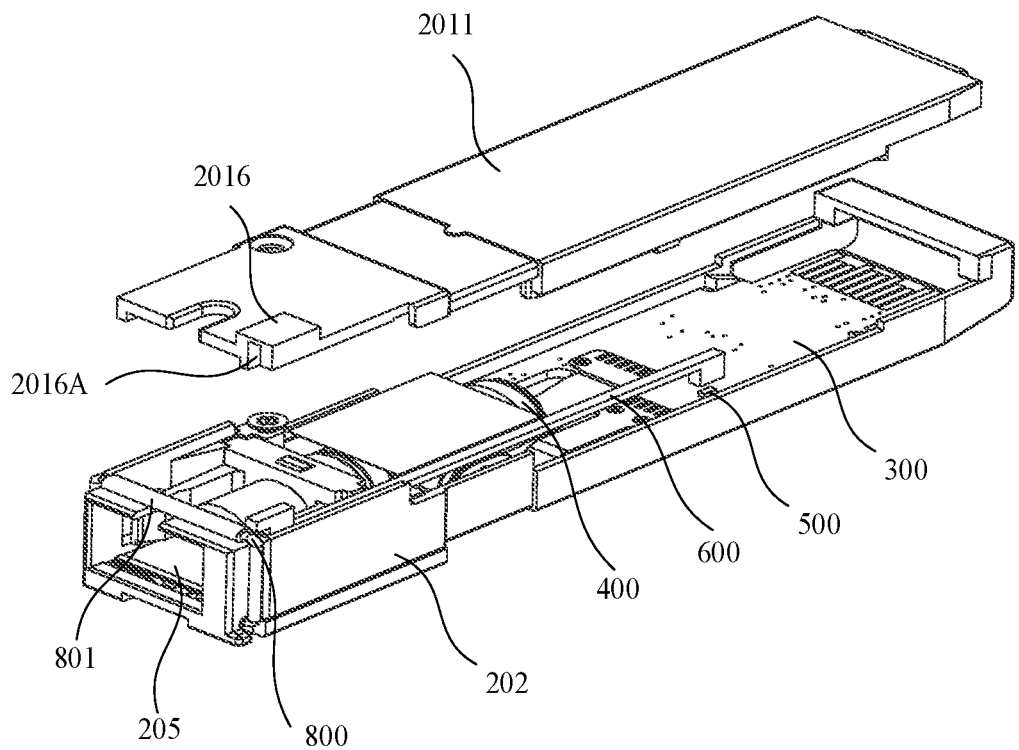
FIG. 13 is an exploded structural diagram of the components shown in FIG. 12.

In some embodiments, as shown in FIGS. 6 and 13, the optical module 200 further includes a handle 800. The handle 800 is disposed at an end of the lower shell 202 proximate to the optical port 205, and the handle 800 is arranged to correspond to the output end of the light guide pipe 600. Ends of the two lower side plates 2022 of the lower shell 202 proximate to the optical port 205 both extend toward an inside of the optical module 200, so as to form a support surface on which the handle 800 is disposed.

In order to transmit the received light of different colors emitted by the light guide pipe 600, in some embodiments of the present disclosure, the optical module 200 further includes a display layer 801. The display layer 801 is disposed outside of the handle 800 and wraps the handle 800. The display layer 801 is configured to transmit the light emitted by the display light 500. In some embodiments, display layer 801 may be a semi-transparent PC display layer or a semi-transparent PC display layer. The semi-transparent PC display layer or the transparent PC display layer may transmit the received light emitted by the display light.

In some embodiments, the handle 800 may be in the shape of a cylinder or a cuboid. In order to make the display layer 801 transmit the light of different colors of the display light 500 as much as possible, in a case where the handle 800 is in the shape of a cylinder, the display layer 801 is in the shape of a hollow cylinder; in a case where the handle 800 is in the shape of a cuboid, the display layer 801 is in the shape of a hollow cuboid.

The user may determine the state of the optical module according to the color of the light transmitted by the display layer 801 on the handle 800. In a case where the color of the light transmitted by the display layer 801 on the handle 800 is green, the optical module operates normally; in a case where the color of the light transmitted by the display layer 801 on the handle 800 is red, the optical module has the problem of "RX Loss of Signal"; and in a case where the color of the light transmitted by the display layer 801 on the handle 800 is yellow, the optical module has the problem of "TX Disable".

In order to enable the display layer 801 on the handle 800 to receive the light emitted from the display light 500 and transmitted by the light guide pipe 600, it may be arranged that the display layer 801 on the handle 800 is at a same horizontal position as an end surface of the output end of the light guide pipe 600. However, it is not limited hereto, it may be arranged that the display layer 801 on the handle 800 is not at a same horizontal position as an end surface of the output end of the light guide pipe 600. Since light is divergent, in a case where the display layer 801 on the handle 800 is a little higher than the end surface of the output end of the light guide pipe 600, the light emitted from the output end of the light guide pipe 600 is directed upward to the display layer 801 on the handle 800. In a case where the display layer 801 on the handle 800 is a little lower than the end surface of the output end of the light guide pipe 600, the light emitted from the output end of the light guide pipe 600 is directed downward to the display layer 801 on the handle 800. In a case where the display layer 801 on the handle 800 is at the same horizontal position as the end surface of the output end of the light guide pipe 600, the light emitted from the output end of the light guide pipe 600 is directed to the display layer 801 on the handle 800 horizontally. In the above three situations, the display layer 801 on the handle 800 may receive the light emitted from the display light 500 and transmitted by the light guide pipe 600. Therefore, the present disclosure is not limited thereto, and specific designs may be provided according to specific situations.

Figure 8:
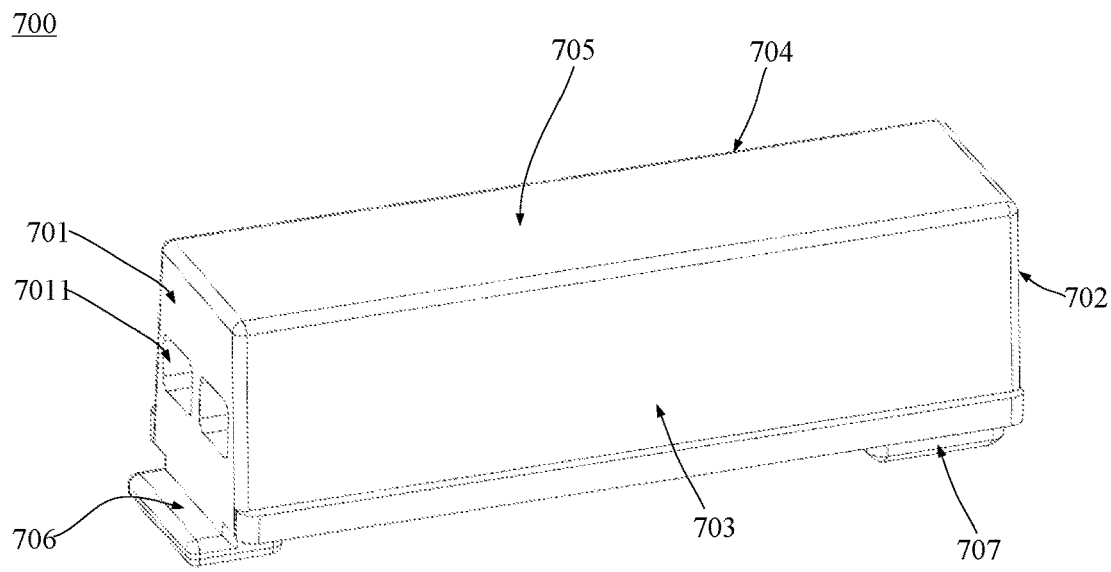
FIG. 8 is a structural diagram of a light guide pipe cover in an optical module, in accordance with some embodiments.
Figure 9:
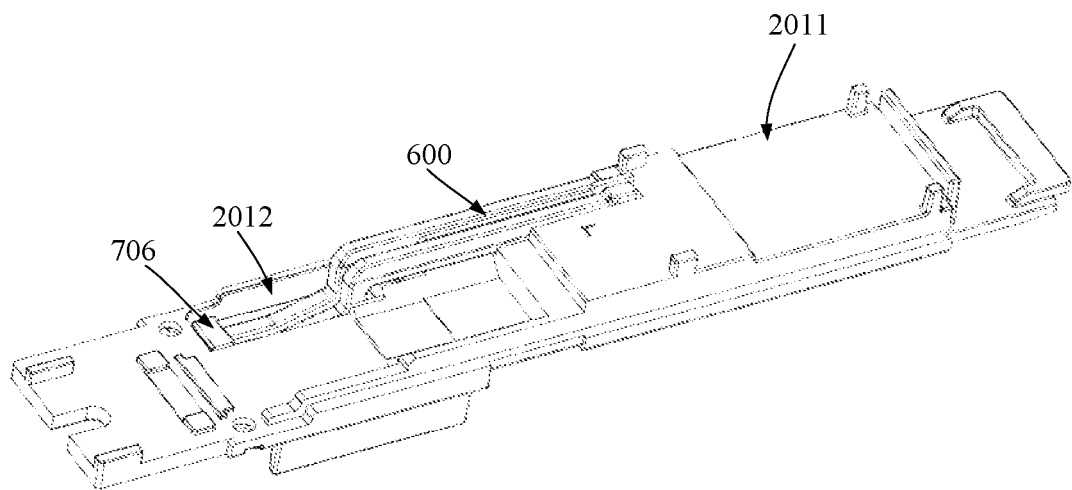
FIG. 9 is an assembly diagram of a light guide pipe, a light guide pipe cover and an upper shell in an optical module, in accordance with some embodiments.
Figure 10:
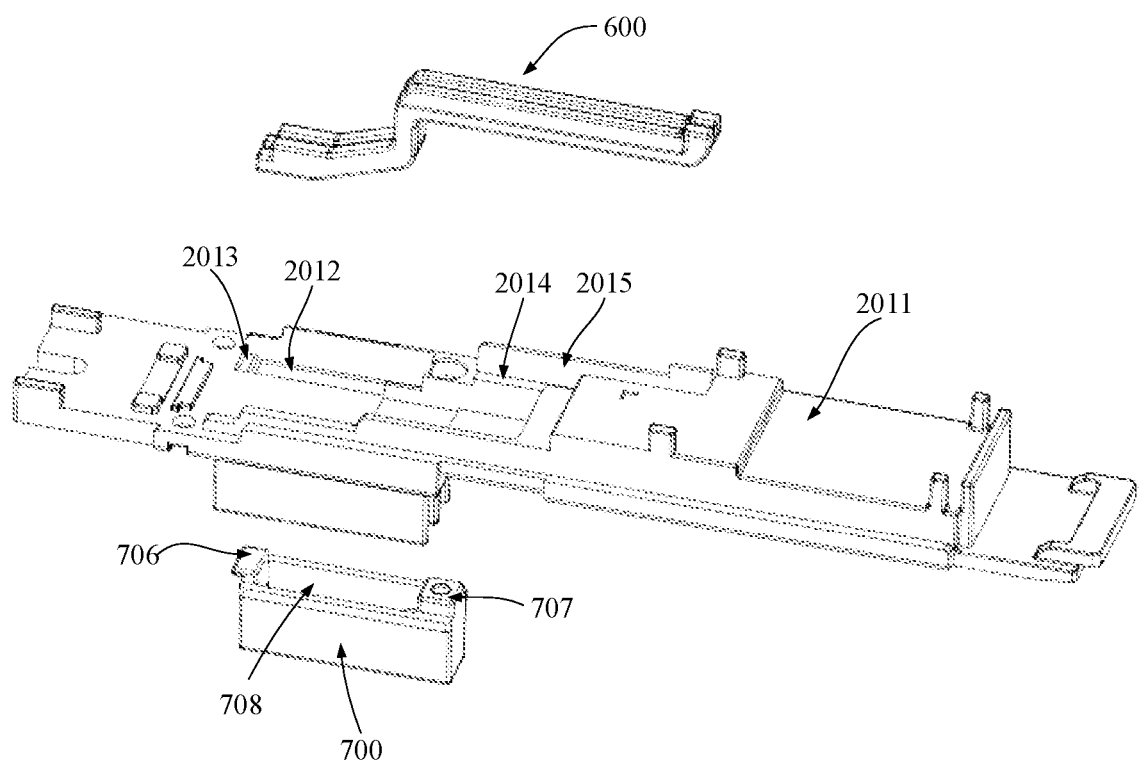
FIG. 10 is an exploded diagram of a light guide pipe, a light guide pipe cover and an upper shell in an optical module, in accordance with some embodiments.

FIG. 8 is a structural diagram of a light guide pipe cover in an optical module, in accordance with some embodiments. FIG. 9 is an assembly diagram of the light guide pipe cover, the upper shell and the light guide pipe, in accordance with some embodiments. FIG. 10 is an assembly exploded diagram of the upper shell, the light guide pipe cover and the light guide pipe, in accordance with some embodiments. As shown in FIGS. 8 to 10, the optical module 200 further includes a light guide pipe cover 700. The light guide pipe cover 700 is disposed on the cover plate 2011, and the light guide pipe cover 700 has a light guide pipe channel therein. When the light guide pipe 600 is installed, firstly, the light guide pipe cover 700 is fixed on the cover plate 2011, and then the output end of the light guide pipe 600 is inserted into the light guide pipe cover 700, which is convenient to fix the light guide pipe 600.

In some embodiments, the upper shell 201 and the light guide pipe cover 700 may be provided separately, or may be integrally formed. By providing the upper shell 201 and the light guide pipe cover 700 separately, it may be easier to form the light guide pipe channel in the light guide pipe cover 700, and insert the light guide pipe 600 into the light guide pipe cover 700. In this way, it is simple and easy to assemble the light guide pipe 600.

The cover plate 2011 has a groove 2012, and the groove 2012 penetrates the cover plate 2011. The light guide pipe cover 700 is clamped in the groove 2012, so that the light guide pipe cover 700 is fixed on the cover plate 2011. The light guide pipe 600 is inserted into the light guide pipe cover 700 through the groove 2012, so that the light guide pipe 600 is fixed inside the light guide pipe cover 700.

In some embodiments, as shown in FIGS. 3 and 4, the optical module 200 further includes at least one heat dissipation fin 900. The heat dissipation fin 900 is disposed on a surface of the cover plate 2011 away from the circuit board 300 and is located on a side of the light guide pipe cover 700. The number of the heat dissipation fins 900 is not limited in the present disclosure, which may be one, two, three or more. For example, FIG. 3 shows three heat dissipation fins.

The light guide pipe cover 700 occupies a region of the upper shell 201 originally intended for heat dissipation fins 900. A height of the light guide pipe cover 700 is set to be less than or equal to a height of the heat dissipation fin, so that an overall size of the optical module does not need to be changed.

In some embodiments of the present disclosure, the light guide pipe cover 700 is a box with an opening 708 on a side. The light guide pipe cover 700 includes an upper cover 705, and a first side plate 701, a second side plate 702, a third side plate 703 and a fourth side plate 704 that are connected to the upper cover 705. The first side plate 701 and the second side plate 702 are disposed opposite to each other, and the third side plate 703 and the fourth side plate 704 are disposed opposite to each other. The light guide pipe cover 700 further includes a clamping portion 706. The clamping portion 706 is disposed at an end of the first side plate 701 proximate to the opening 708 and extends to an outside of the light guide pipe cover 700. The cover plate 2011 has a clamping groove 2013 disposed in the groove 2012 and corresponding to the clamping portion 706. The light guide pipe cover 700 is clamped on the cover plate 2011 through the clamping portion 706 and the clamping groove 2013, so that the light guide pipe cover 700 is fixed on the cover plate 2011.

In order to improve the stability of the light guide pipe cover 700, the light guide pipe cover 700 further includes a platform 707, and the platform 707 is disposed at an end of the second side plate 702 proximate to the opening 708. The platform 707 has a threaded hole therein. The cover plate 2011 has a mounting hole corresponding to the threaded hole. The light guide pipe cover 700 is threadedly connected to the cover plate 2011 through the threaded hole and the mounting hole. That is, after the light guide pipe cover 700 is clamped on the cover plate 2011 through the clamping portion 706 and the clamping groove 2013, a screw is passed through the threaded hole of the light guide pipe cover 700 and the corresponding mounting hole of the cover plate 2011, so as to improve the connection stability between the light guide pipe cover 700 and the cover plate 2011.

In order to make it easier for the user to directly and clearly see the color of the light transmitted by the light guide pipe 600, it may be arranged that the light guide pipe cover 700 includes a light passing hole 7011 disposed on the first side plate 701, and the output end of the light guide pipe 600 is inserted into the light passing hole 7011. In some embodiments, the end surface of the output end of the light guide pipe 600 is flush with an outer end surface of the first side plate 701 of the light guide pipe cover 700. Alternatively, the end surface of the output end of the light guide pipe 600 may also slightly protrude from the outer end surface of the first side plate 701 of the light guide pipe cover 700. In this way, the user may see the color of the light transmitted by the light guide pipe 600 from the exposed light guide pipe 600, thereby directly obtaining the operation state of the optical module 200.

In some embodiments, a shape of the light passing hole 7011 matches a shape of the output end of the light guide pipe 600. In a case where the output end of the light guide pipe 600 is in the shape of a cylinder, the light passing hole 7011 is in the shape of a circle. In a case where the output end of the light guide pipe 600 is in the shape of a cuboid, the light passing hole 7011 is in the shape of a rectangle. In a case where the output end of the light guide pipe 600 is in the shape of a triangular prism, the light passing hole 7011 is in the shape of a triangle.

Figure 11:
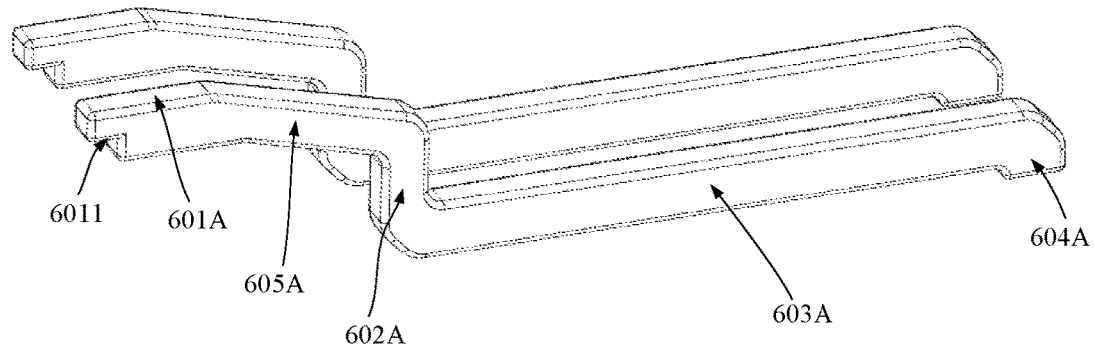
FIG. 11 is a structural diagram of a light guide pipe in an optical module, in accordance with some embodiments.

As shown in FIG. 11, the light guide pipe 600 includes a first connection portion 601A, a second connection portion 602A, a third connection portion 603A and a fourth connection portion 604A. A first end of the second connection portion 602A is connected to a second end of the first connection portion 601A, a second end of the second connection portion 602A is connected to a first end of the third connection portion 603A, and a second end of the third connection portion 603A is connected to a first end of the fourth connection portion 604A. A first end of the first connection portion 601A is the output end of the light guide pipe 600 and is used to let out the light emitted by the display light 500. A second end of the fourth connection portion 604A is the input end of the light guide pipe 600, which is arranged to correspond to the display light 500 and used to receive the light emitted by the display light 500.

The fourth connection portion 604A is substantially perpendicular to the circuit board 300, and the third connection portion 603A and the fourth connection portion 604A are substantially perpendicular to each other. That is, the third connection portion 603A is substantially parallel to the circuit board 300. The first connection portion 601A and the third connection portion 603A are substantially parallel to each other. That is, the first connection portion 601A is also substantially parallel to the circuit board 300. The second connection portion 602A is substantially perpendicular to the first connection portion 601A and the third connection portion 603A. That is, the second connection portion 602A is substantially perpendicular to the circuit board 300.

In some embodiments, as shown in FIG. 11, the first connection portion 601A and the second connection portion 602A are connected through an arc-shaped portion, the second connection portion 602A and the third connection portion 603A are connected through an arc-shaped portion, and the third connection portion 603A and the fourth connection portion 604A are connected through an arc-shaped portion.

When the light guide pipe 600 is installed, the first connection portion 601A and the second connection portion 602A are both located in the light guide pipe cover 700. The first connection portion 601A is located above the cover plate 2011, i.e., located on the side of the cover plate 2011 away from the circuit board 300. The second connection portion 602A may abut against inner surfaces of the third side plate 703 and the fourth side plate 704 of the light guide pipe cover 700. The third connection portion 603A and the fourth connection portion 604A are located below the cover plate 2011, i.e., located between the cover plate 2011 and the circuit board 300; and the fourth connection portion 604A corresponds to the display light 500. In this way, the light guide pipe 600 enables the light emitted by the display light 500 below the cover plate 2011 to be transmitted through the cover plate 2011 to the light guide pipe cover 700 above the cover plate 2011. The provision of the light passing hole 7011 in the light guide pipe cover 700 exposes the first end (the output end of the light guide pipe 600) of the first connection portion 601A, so that the light inside the light guide pipe cover 700 is transmitted to the outside of the optical module 200.

In some embodiments, in order to make it easier to insert the output end of the light guide pipe 600 into the light passing hole 7011 of the light guide pipe cover 700, as shown in FIG. 11, the output end of the light guide pipe 600 has a notch 6011, which abuts against an edge of the light passing hole 7011. That is, when the output end of the light guide pipe 600 is inserted into the light passing hole 7011, the notch 6011 abuts against an inner end surface of the first side plate 701. In this way, the light guide pipe 600 may be fixed in the light guide pipe cover 700.

In some embodiments, the output end of the light guide pipe 600 may also be a square end. The square end is inserted into the light passing hole 7011 of the light guide pipe cover 700, so as to fix the light guide pipe 600 in the light guide pipe cover 700.

In some embodiments, as shown in FIG. 11, the light guide pipe 600 further includes a fifth connection portion 605A disposed obliquely. Two ends of the fifth connection portion 605A are connected to the first connection portion 601A and the second connection portion 602A, respectively. In addition, there is a preset angle between the fifth connection portion 605A and the second connection portion 602A, and the preset angle is an angle greater than 90 degrees. The fifth connection portion 605A is also located in the light guide pipe cover 700, and the fifth connection portion 605A is located above the cover plate 2011, i.e., located on the side of the cover plate 2011 away from the circuit board 300. The fifth connection portion 605A is disposed obliquely upward with respect to the second connection portion 602A, so as to avoid the heat dissipation fin on the cover plate 2011, and improve the heat dissipation efficiency of the heat dissipation fin of the optical module 200.

In some embodiments, the cover plate 2011 includes a mounting groove 2014 disposed on a surface thereof proximate to the circuit board 300. An end of the mounting groove 2014 is proximate to the platform 707 of the light guide pipe cover 700. The first connection portion 601A of the light guide pipe 600 is inserted into the light guide pipe cover 700, the third connection portion 603A of the light guide pipe 600 is embedded in the mounting groove 2014 of the cover plate 2011, and the second connection portion 602A of the light guide pipe 600 is in contact with the inner surfaces of the third side plate 703 and the fourth side plate 704 of the light guide pipe cover 700, so as to make up for a height difference between a cavity of the light guide pipe cover 700 and the cover plate 2011.

After the third connection portion 603A of the light guide pipe 600 is embedded into the mounting groove 2014 of the cover plate 2011, an end of the light guide pipe 600 proximate to the fourth connection portion 604A is fixed to the cover plate 2011 through a glue dispensing process, so as to enhance the installation stability of the light guide pipe 600.

In some embodiments, in order to display the operation states of different components in the optical module 200, a plurality of display lights 500 may be provided on the circuit board 300, and different colors of light emitted by different display lights 500 indicate the operation states of different components. The following description will be given by taking an example where two display lights 500 are provided on the circuit board 300.

In a direction substantially perpendicular to the longitudinal direction of the optical module 200, two display lights 500 are provided on the circuit board 300. Correspondingly, two light guide pipes 600 are embedded in the shell of the optical module 200. The fourth connection portions 604A of the two light guide pipes 600 are arranged corresponding to the two display lights 500, respectively. The light emitted by different display lights 500 are transmitted by the corresponding light guide pipes 600, respectively.

In a case where the optical module 200 includes two light guide pipes 600, the light guide pipe cover 700 has two corresponding light guide pipe channels, and the first side plate 701 of the light guide pipe cover 700 is provided with two corresponding light passing holes 7011. After the light guide pipe cover 700 is fixed on the cover plate 2011, the first connection portions 601A of the two light guide pipes 600 are embedded in the two light guide pipe channels of the light guide pipe cover 700, respectively. The output end of each light guide pipe 600 is inserted into a corresponding light passing hole 7011 of the light guide pipe cover 700, making it easier for the user to see the color of the light transmitted by the two light guide pipes 600 and thus directly obtain the operation state of each component in the optical module 200.

In the case where the optical module includes two light guide pipes 600, the cover plate 2011 includes two mounting grooves 2014, and the third connection portions 603A of the two light guide pipes 600 are embedded in the corresponding mounting grooves 2014, respectively. After the third connection portion 603A of the light guide pipe 600 is embedded into a corresponding mounting groove 2014 of the cover plate 2011, the end of the light guide pipe 600 proximate to the fourth connection portion 604A is fixed to the cover plate 2011 through the glue dispensing process, so as to enhance the installation stability of the light guide pipe 600.

In some embodiments, in a case where the cover plate 2011 includes a plurality of mounting grooves 2014 to install a plurality of light guide pipes 600, the optical module 200 includes a partition plate 2015 disposed between adjacent mounting grooves 2014. The partition plate 2015 is configured to separate the plurality of light guide pipes 600, so as to prevent light mixing among the light guide pipes 600. A light mixing problem may cause the color of the light guide pipes 600 to be unclear and make it impossible to judge the operation state of the optical module correctly.

In some embodiments, the cover plate 2011 and the partition plate 2015 may be provided separately, or may be integrally formed.

Figure 12:
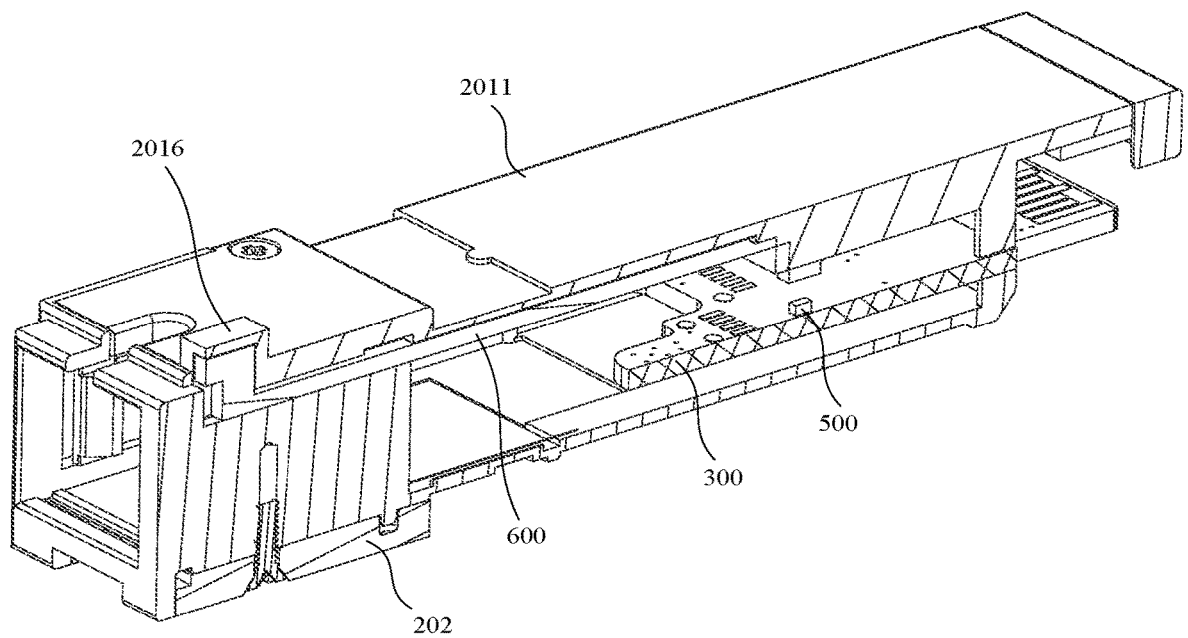
FIG. 12 is a cross-sectional diagram showing another assembly structure of a light guide pipe and an upper shell, in accordance with some embodiments.
Figure 14:
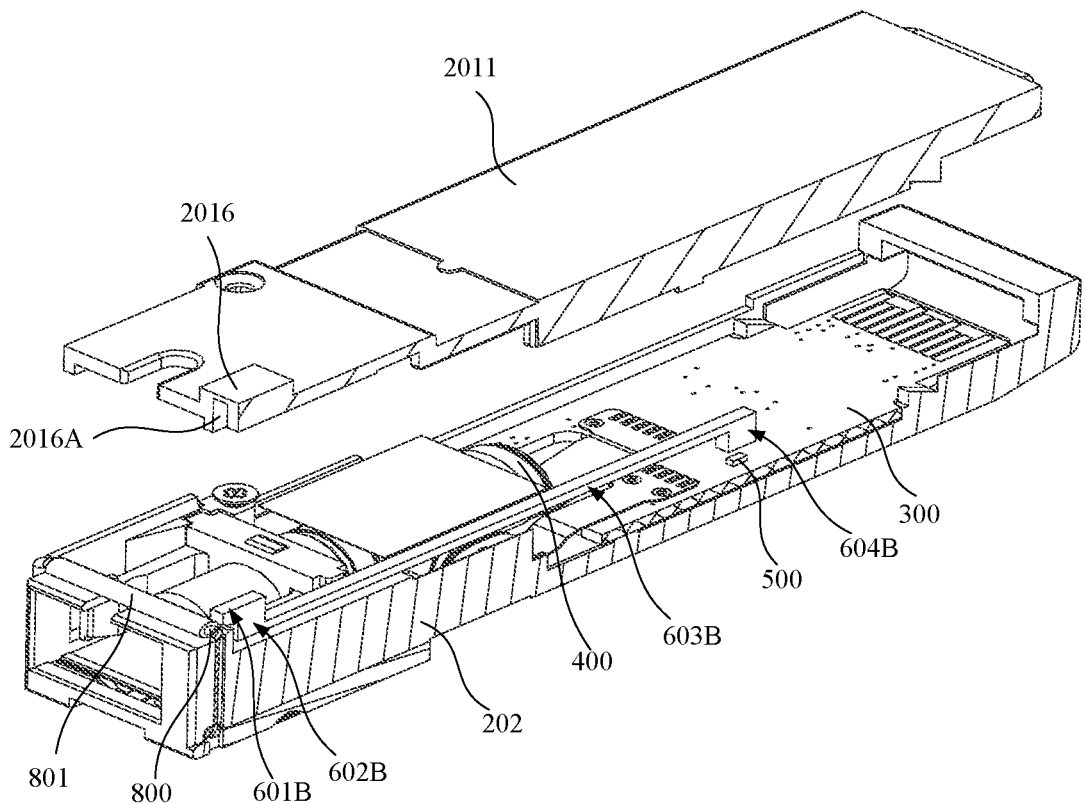
FIG. 14 is a cross-sectional diagram of FIG. 13 from one perspective.
Figure 15:
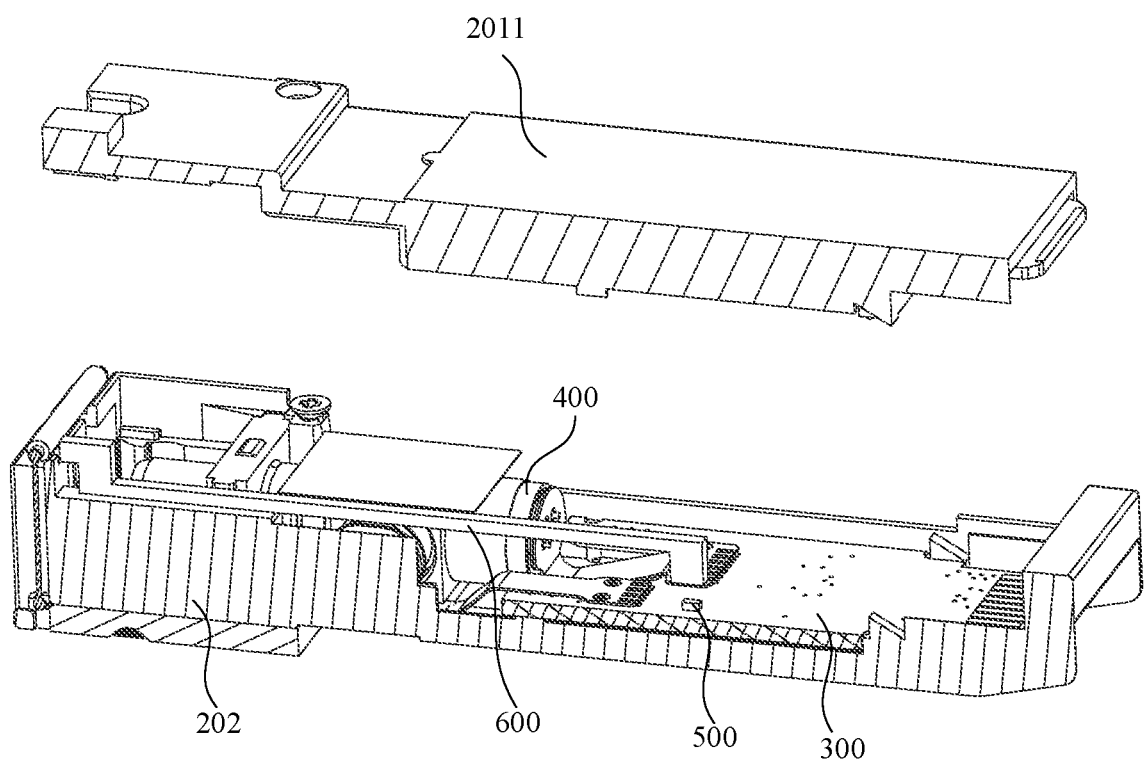
FIG. 15 is a cross-sectional diagram of FIG. 13 from another perspective.

In some other embodiments, the output end of the light guide pipe 600 is embedded in the cover plate 2011, so as to achieve fixation of the light guide pipe 600. FIG. 12 is a cross-sectional diagram showing another assembly structure of the light guide pipe and the upper shell, in accordance with some embodiments. FIG. 13 is an exploded structural diagram of the components shown in FIG. 12. FIG. 14 is a cross-sectional diagram of FIG. 13 from one perspective. FIG. 15 is a cross-sectional diagram of FIG. 13 from another perspective. As shown in FIGS. 12 to 15, the upper shell 201 further includes a boss 2016, and the boss 2016 is disposed at an end of the cover plate 2011 proximate to the output end of the light guide pipe 600. The boss 2016 has a groove 2016A therein, and the groove 2016A is configured to fix the light guide pipe 600. For example, the groove 2016A is coated with an adhesive, and the output end of the light guide pipe 600 is bonded to the groove 2016A by the adhesive.

In some embodiments, the case that the output end of the light guide pipe 600 is bonded to the groove 2016A includes the following three situations: the end surface of the output end of the light guide pipe 600 is located inside the groove 2016A; the end surface of the output end of the light guide pipe 600 is flush with an end surface of the groove 2016A; and the end surface of the output end of the light guide pipe 600 protrudes from the end surface of the groove 2016A.

In a case where the end surface of the output end of the light guide pipe 600 is located inside the groove 2016A, the end surface of the output end of the light guide pipe 600 is farther away from the optical port 205 than the end surface of the boss 2016 proximate to the optical port 205. In a case where the end surface of the output end of the light guide pipe 600 is flush with the end surface of the groove 2016A, the end surface of the output end of the light guide pipe 600 and the end surface of the boss 2016 proximate to the optical port 205 are located in a same plane. In a case where the end surface of the output end of the light guide pipe 600 protrudes from the end surface of the groove 2016A, the end surface of the output end of the light guide pipe 600 is closer to the optical port 205 than the end surface of the boss 2016 proximate to the optical port 205. The above positional relationships between the end surface of the output end of the light guide pipe 600 and the end surface of the groove 2016A may all achieve fixation of the output end of the light guide pipe 600 in the groove 2016A. Therefore, the present disclosure is not limited thereto, and specific designs may be provided according to specific situations.

In some embodiments, a shape of the groove 2016A matches the shape of the light guide pipe 600. In a case where the output end of the light guide pipe 600 is in the shape of a cylinder, the groove 2016A is in the shape of a semicircle. In a case where the output end of the light guide pipe 600 is in the shape of a cuboid, the groove 2016A is in the shape of a capital letter "U". In a case where the output end of the light guide pipe 600 is in the shape of a triangular prism, the shape of the groove 2016A is in the shape of a capital letter "V".

In order to enable the output end of the light guide pipe 600 to be embedded in the groove 2016A, it may be arranged that a size of the groove 2016A is larger than a size of the output end of the light guide pipe 600. In order to firmly fix the output end of the light guide pipe 600 in the groove 2016A, it may be arranged that the size of the groove 2016A matches the size of the output end of the light guide pipe 600.

As shown in FIG. 14, the light guide pipe 600 includes an extension portion 601B, a second bending portion 602B, a main body portion 603B and a first bending portion 604B. A first end of the second bending portion 602B is connected to a second end of the extension portion 601B, a second end of the second bending portion 602B is connected to a first end of the main body portion 603B, and a second end of the main body portion 603B is connected to a first end of the first bending portion 604B. A first end of the extension portion 601B is the output end of the light guide pipe 600 and is used to let out the light emitted by the display light 500. A second end of the first bending portion 604B is the input end of the light guide pipe 600, which is arranged to correspond to the display light 500 and used to receive the light emitted by the display light 500. The extension portion 601B and the second bending portion 602B form a structure in the shape of a number "7", and the main body portion 603B and the first bending portion 604B also form a structure in the shape of the number "7".

When the light guide pipe 600 is fixed, the extension portion 601B, the second bending portion 602B, the main body portion 603B and the first bending portion 604B are all located inside the shell of the optical module 200, the extension portion 601B is fixed in the groove 2016A of the upper shell 201, and the first bending portion 604B corresponds to the display light 500. The provision of the groove 2016A exposes the first end (the output end of the light guide pipe 600) of the extension portion 601B, so that the light emitted by the display light 500 is transmitted to the outside of the optical module 200 through the light guide pipe 600.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:
1. An optical module, comprising:
a shell;
a circuit board disposed inside the shell;
a display light disposed on the circuit board and configured to emit light of different colors;
a light guide pipe disposed between the shell and the circuit board, an input end of the light guide pipe being arranged to correspond to the display light, an output end of the light guide pipe being configured to transmit light emitted by the display light to an outside of the optical module;
a light guide pipe cover disposed on the shell;
a heat dissipation fin disposed on the shell;
a handle disposed at an end of the shell proximate to the output end of the light guide pipe, the handle corresponding to the output end of the light guide pipe; and
a display layer disposed on an outside of the handle and wrapping the handle, the display layer being configured to transmit the light transmitted by the light guide pipe, wherein
the shell includes a groove, and the output end of the light guide pipe is fixed in the groove, so that the shell is fixed with the light guide pipe;
the light guide pipe cover is clamped in the groove, so as to be fixed on the shell;
the groove penetrates the shell; the light guide pipe cover has a shape of a box with an opening on a side, and the light guide pipe cover includes a first side plate and a second side plate that are disposed opposite to each other; the first side plate has a light passing hole, and the output end of the light guide pipe is disposed in the light passing hole;
the light guide pipe is inserted into the light guide pipe cover through the groove, so that the light guide pipe is fixed inside the light guide pipe cover; and the heat dissipation fin and the light guide pipe cover are located on a same side of the shell, and a height of the light guide pipe cover is less than or equal to a height of the heat dissipation fin.

2. The optical module according to claim 1, wherein an end surface of the output end of the light guide pipe is flush with or protrudes from an outer end surface of the first side plate.

3. The optical module according to claim 1, wherein the light guide pipe cover further includes a clamping portion; the clamping portion is disposed at an end of the first side plate proximate to the opening, and the clamping portion extends to an outside of the light guide pipe cover;

the shell further includes a clamping groove; the clamping groove is disposed in the groove, and the light guide pipe cover is clamped in the clamping groove by the clamping portion, so as to be fixed on the shell.

4. The optical module according to claim 1, wherein the light guide pipe cover further includes a platform; the platform is disposed at an end of the second side plate proximate to the opening, and the platform has a threaded hole therein;

the shell has a mounting hole corresponding to the threaded hole, and the light guide pipe cover is threadedly connected to the shell through the threaded hole and the mounting hole.

5. The optical module according to claim 1, wherein the light guide pipe includes a first connection portion, a second connection portion, a third connection portion and a fourth connection portion;

a first end of the first connection portion is the output end of the light guide pipe; a first end of the second connection portion is connected to a second end of the first connection portion, and a second end of the second connection portion is connected to a first end of the third connection portion; a second end of the third connection portion is connected to a first end of the fourth connection portion, and a second end of the fourth connection portion is the input end of the light guide pipe.

6. The optical module according to claim 5, wherein the fourth connection portion is substantially perpendicular to the circuit board, and the third connection portion is substantially perpendicular to the fourth connection portion; the first connection portion is substantially parallel to the third connection portion, and the second connection portion is substantially perpendicular to the first connection portion and the third connection portion.

7. The optical module according to claim 5, wherein the light guide pipe cover further includes a third side plate and a fourth side plate that are disposed opposite to each other; the third side plate is located between the first side plate and the second side plate, and the fourth side plate is located between the first side plate and the second side plate, wherein the second connection portion abuts against both an inner surface of the third side plate and an inner surface of the fourth side plate.

8. The optical module according to claim 5, wherein the light guide pipe further includes a fifth connection portion disposed obliquely; two ends of the fifth connection portion are respectively connected to the first connection portion and the second connection portion; and the fifth connection portion and the second connection portion has a preset obtuse angle.

9. The optical module according to claim 5, wherein the output end of the light guide pipe has a notch, and the notch abuts against an inner end surface of the first side plate.

10. The optical module according to claim 9, wherein the shell has a mounting groove; an end of the mounting groove is proximate to the second side plate of the light guide pipe cover, and the third connection portion of the light guide pipe is embedded in the mounting groove.

11. The optical module according to claim 10, wherein the optical module includes a plurality of light guide pipes; the shell has a plurality of mounting grooves, and the plurality of light guide pipes are embedded in corresponding mounting grooves respectively;

the optical module further includes a partition plate disposed between adjacent mounting grooves, and the partition plate is configured to separate the plurality of light guide pipes.

12. An optical module, comprising:
a shell;
a circuit board disposed inside the shell;
a display light disposed on the circuit board and configured to emit light of different colors; and
a light guide pipe disposed between the shell and the circuit board, an input end of the light guide pipe being arranged to correspond to the display light, an output end of the light guide pipe being configured to transmit light emitted by the display light to an outside of the optical module, wherein
the shell includes a groove, and the output end of the light guide pipe is fixed in the groove, so that the shell is fixed with the light guide pipe; and
the shell includes a boss, the boss is disposed at an end of the shell proximate to the output end of the light guide pipe, the groove is disposed in the boss, and the output end of the light guide pipe is embedded in the groove.

13. The optical module according to claim 12, wherein the output end of the light guide pipe is fixed in the groove by an adhesive.

14. The optical module according to claim 12, wherein the light guide pipe includes a main body portion, a first bending portion, a second bending portion and an extension portion;

a first end of the extension portion is the output end of the light guide pipe; a first end of the second bending portion is connected to a second end of the extension portion, and a second end of the second bending portion is connected to a first end of the main body portion; a second end of the main body portion is connected to a first end of the first bending portion, and a second end of the first bending portion is the input end of the light guide pipe.

15. The optical module according to claim 1, wherein the display layer includes a semi-transparent polycarbonate (PC) display layer or a transparent PC display layer.

16. The optical module according to claim 1, wherein the display light includes:

a first light-emitting diode to emit a light having a first color, a first triode, a first resistor, a second resistor and a third resistor, wherein a base of the first triode is connected, through the first resistor, to a first end at which a first control signal is supplied, an emitter of the first triode is grounded, a collector of the first triode is connected to a cathode of the first light-emitting diode through the third resistor, an anode of the first light-emitting diode is connected to an external power source, a terminal of the second resistor is connected to the base of the first triode, and another terminal of the second resistor is connected to the emitter of the first triode; and a second light-emitting diode to emit a light having a second color different from the first color, a second triode, a fourth resistor, a fifth resistor and a sixth resistor, wherein a base of the second triode is connected, through the fourth resistor, to a second end at which a second control signal is supplied, an emitter of the second triode is grounded, a collector of the second triode is connected to a cathode of the second light-emitting diode through the sixth resistor, an anode of the second light-emitting diode is connected to the external power source, a terminal of the fifth resistor is connected to the base of the second triode, and another terminal of the fifth resistor is connected to the emitter of the second triode.

17. The optical module according to claim 16, further comprising:
 a light emitting device configured to convert a first electrical signal into a first optical signal and transmit the first optical signal out through an optical fiber;
 a light receiving device configured to convert a second optical signal transmitted from the optical fiber into a second electrical signal;
 a control pin of the light emitting device configured to output a signal for indicating an operation state of the light emitting device;
 a control pin of the light receiving device configured to output a signal for indicating an operation state of the light receiving device; and
 a processor configured to receive the signal output by the control pin of the light emitting device and the signal output by the control pin of the light receiving device, and control a voltage level of the first control signal at the first end and a voltage level of the second control signal at the second end according to the received two signals, so as to control a color of the light emitted by the display light.

18. The optical module according to claim 12, further comprising:
 a handle disposed at an end of the shell proximate to the output end of the light guide pipe, the handle corresponding to the output end of the light guide pipe; and
 a display layer disposed on an outside of the handle and wrapping the handle, the display layer being configured to transmit the light transmitted by the light guide pipe.

19. The optical module according to claim 18, wherein the display layer includes a semi-transparent polycarbonate (PC) display layer or a transparent PC display layer.

20. The optical module according to claim 12, wherein the display light includes:
 a first light-emitting diode to emit a light having a first color, a first triode, a first resistor, a second resistor and a third resistor, wherein a base of the first triode is connected, through the first resistor, to a first end at which a first control signal is supplied, an emitter of the first triode is grounded, a collector of the first triode is connected to a cathode of the first light-emitting diode through the third resistor, an anode of the first light-emitting diode is connected to an external power source, a terminal of the second resistor is connected to the base of the first triode, and another terminal of the second resistor is connected to the emitter of the first triode; and
 a second light-emitting diode to emit a light having a second color different from the first color, a second triode, a fourth resistor, a fifth resistor and a sixth resistor, wherein a base of the second triode is connected, through the fourth resistor, to a second end at which a second control signal is supplied, an emitter of the second triode is grounded, a collector of the second triode is connected to a cathode of the second light-emitting diode through the sixth resistor, an anode of the second light-emitting diode is connected to the external power source, a terminal of the fifth resistor is connected to the base of the second triode, and another terminal of the fifth resistor is connected to the emitter of the second triode.

\* \* \* \* \*